(12) United States Patent
Kwak et al.

(10) Patent No.: US 8,867,505 B2
(45) Date of Patent: Oct. 21, 2014

(54) FAST DATA-LINK CONNECTION METHOD FOR SAVING CONNECTION TIME IN CDMA 2000 NETWORK

(75) Inventors: Seunghwan Kwak, Seoul (KR); Jonghoon Park, Seoul (KR); Jungpyo Han, Gimpo-si (KR); Sangyun Lee, Seongnam-si (KR); Sehyun Oh, Seoul (KR); Sung Kim, Seongnam-si (KR); Myungsung Lee, Seoul (KR); Namgyu Kim, Suwon-si (KR); Hojin Yang, Bucheon-si (KR); Seongho Ha, Goyang-si (KR); Jongtae Ihm, Seongnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 1736 days.

(21) Appl. No.: 11/993,067

(22) PCT Filed: Jun. 20, 2006

(86) PCT No.: PCT/KR2006/002369
§ 371 (c)(1),
(2), (4) Date: Dec. 19, 2007

(87) PCT Pub. No.: WO2006/137676
PCT Pub. Date: Dec. 28, 2006

(65) Prior Publication Data
US 2010/0214975 A1    Aug. 26, 2010

(30) Foreign Application Priority Data
Jun. 20, 2005  (KR) .................. 10-2005-0052805

(51) Int. Cl.
*H04W 4/00*  (2009.01)
*H04J 3/24*  (2006.01)
(Continued)

(52) U.S. Cl.
CPC ............... *H04L 63/08* (2013.01); *H04W 12/06* (2013.01); *H04L 63/205* (2013.01); *H04L*
(Continued)

(58) Field of Classification Search
USPC ............ 370/231, 329, 475, 338, 349, 395.52; 455/411, 445; 726/21; 709/227, 237
See application file for complete search history.

(56) References Cited

U.S. PATENT DOCUMENTS 6,483,822 B1 *  11/2002  Lioy et al. ..................... 370/329
6,785,823 B1 *  8/2004   Abrol et al. ....................... 726/7
(Continued)

FOREIGN PATENT DOCUMENTS

| JP | 2005-159519 | 6/2005 |
|---|---|---|
| KR | 2005-0040429 | 5/2005 |
| WO | 2004/112349 | 12/2004 |

OTHER PUBLICATIONS

Chinese Office Action for 200680022304.1 dated Aug. 1, 2011.

*Primary Examiner* — Alpus H Hsu
*Assistant Examiner* — Yee Lam
(74) *Attorney, Agent, or Firm* — Lowe Hauptman & Ham, LLP (57) ABSTRACT

Disclosed herein is a fast data call connection method capable of reducing a connection time and increasing the probability of connection success in a CDMA 2000 network.
In the fast data call connection method of the present invention, the PDSN transmits a data call connection request message, including an authentication type and a challenge value, to the MS. The MS transmits a data call connection response message, including a response to the challenge value, to the PDSN. The PDSN performs authentication with reference to the data call connection response message, and transmits a data call connection complete message to the MS if authentication succeeds. Accordingly, the present invention is advantageous in that it can reduce connection time, can increase the probability of connection success, and can guarantee compatibility by checking the MS version before a data call connection process is executed.

21 Claims, 6 Drawing Sheets

(51) Int. Cl.
*H04L 12/28* (2006.01)
*H04W 40/00* (2009.01)
*G06F 15/16* (2006.01)
*H04M 1/66* (2006.01)
*H04M 1/68* (2006.01)
*H04M 3/16* (2006.01)
*G06F 7/04* (2006.01)
*G06F 12/00* (2006.01)
*G06F 12/14* (2006.01)
*G06F 13/00* (2006.01)
*G06F 17/30* (2006.01)
*G11C 7/00* (2006.01)
*H04L 29/06* (2006.01)
*H04W 12/06* (2009.01)

(52) U.S. Cl.
CPC .......................................... 63/0838 (2013.01)
USPC ...... 370/338; 370/349; 370/395.52; 455/411; 455/445; 726/21; 709/227; 709/237

(56) References Cited

U.S. PATENT DOCUMENTS

| | | | |
|---|---|---|---|
| 2002/0154627 A1* | 10/2002 | Abrol et al. | 370/352 |
| 2002/0167909 A1* | 11/2002 | Balazinski et al. | 370/252 |
| 2004/0114553 A1* | 6/2004 | Jiang et al. | 370/328 |
| 2005/0079869 A1* | 4/2005 | Khalil et al. | 455/435.1 |
| 2005/0089008 A1* | 4/2005 | Choo et al. | 370/349 |
| 2005/0102514 A1* | 5/2005 | Bergenwall et al. | 713/168 |
| 2006/0009197 A1 | 1/2006 | Chiba et al. | |
| 2006/0072512 A1* | 4/2006 | Das et al. | 370/335 |
| 2006/0095962 A1* | 5/2006 | Lioy et al. | 726/21 |
| 2006/0248342 A1* | 11/2006 | Bajar et al. | 713/182 |
| 2007/0160059 A1* | 7/2007 | Poeluev et al. | 370/395.3 |
| 2008/0101291 A1* | 5/2008 | Jiang et al. | 370/331 |
| 2010/0157946 A1* | 6/2010 | Nasielski et al. | 370/331 |

* cited by examiner

FAST DATA-LINK CONNECTION METHOD FOR SAVING CONNECTION TIME IN CDMA 2000 NETWORK

CROSS REFERENCE TO RELATED APPLICATION

This application is the National Phase application of International Application No. PCT/KR2006/002369, filed Jun. 20, 2006, which designates the United States and was published in English. This application, in its entirety, is incorporated herein by reference.

TECHNICAL FIELD

The present invention relates, in general, to a data call connection method for reducing connection time in a CDMA 2000 network and, more particularly, to a fast data call connection method for reducing connection time in a CDMA 2000 network, which eliminates an unnecessary procedure from a conventional PPP negotiation process, and minimizes the number of messages, thus reducing connection time and increasing the probability of connection success.

BACKGROUND ART

Recently, as the development of the mobile communication environment is predicted to be highly likely, the market requirement for continuous fast access to the mobile Internet has increased. However, although a Code Division Multiple Access (CDMA) network has developed into CDMA 2000 networks, for example, CDMA2000 1X and Evolution Data Optimized (EV-DO) (High Rate Packet Data: HRPD) networks, the initial connection time has not improved. Such a delay in initial connection time acts as a factor causing dissatisfaction in users provided with Wireless Application Protocol (WAP) services over the CDMA 2000 networks. Service providers reduce the apparent connection time, as perceived by users, by storing cache in terminal memory.

However, network service providers do not currently detect a method for improving Point-to-point protocol (PPP) connection time, which is standardized in the 3rd Generation Partnership Project 2 (3GPP2) standards. For PPP negotiation in CDMA 2000 networks, a minimum of 13 messages are exchanged between peers even if parameters are optimized between a Mobile Station (MS) and a Packet Data Service Node (PDSN).

Figure 1:
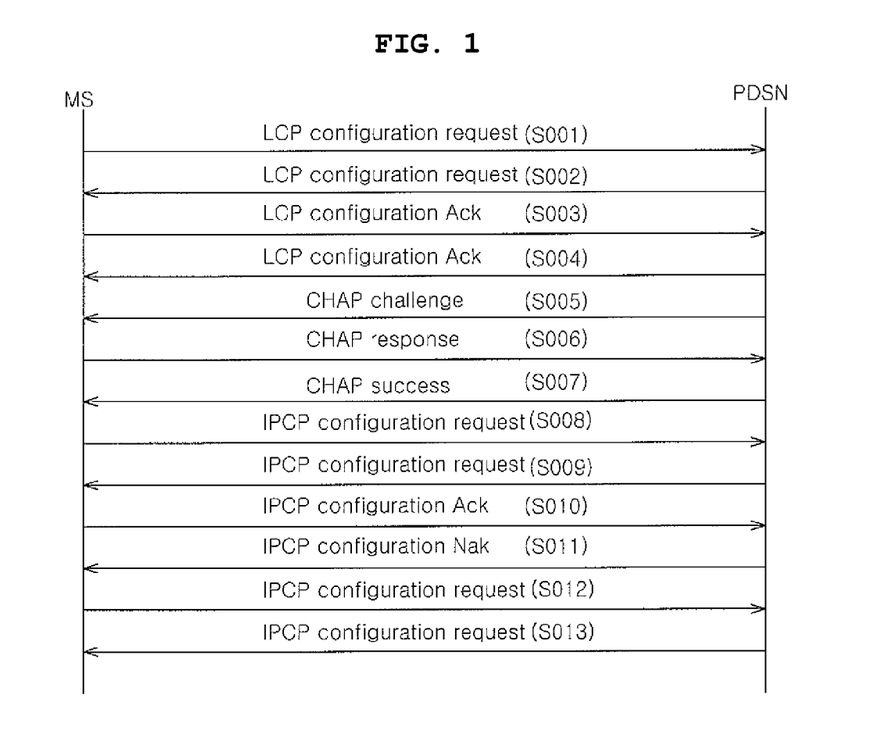
FIG. 1 is a flow diagram of a conventional PPP negotiation process for data call connection.

That is, referring to the PPP negotiation process shown in FIG. 1, request messages for link configuration (LCP Configuration Request) and acknowledgment messages to the link configuration request (LCP Configuration Ack) should be exchanged between an MS and a PDSN in a Link Control Protocol (LCP) state, so that a total of four messages are transmitted and received at steps S001 to S004. Even in a Challenged Handshake Authentication Protocol (CHAP) authentication procedure, three messages should be exchanged at steps S005 to S007. Further, in an Internet Protocol (IP) Control Protocol (IPCP) negotiation procedure, a message (Nak), required to assign an IP address and a Domain Name Server (DNS) address to the MS, is added, so that a minimum of 6 messages should be exchanged at steps S008 to S013.

Problems occurring according to the characteristics of a wireless network in the above procedure are described as follows.

First, when the state of a wireless network is bad, messages may be lost. If an acknowledgement response message (Ack) is lost, status inconsistency occurs between both peers, so that there is a probability that the peers may fall into a loop, and such a phenomenon actually occurs in a CDMA 2000 network.

Second, there is no need to use all of the options used for PPP connection in respective states. Actually, an option necessary for a CDMA 2000 network at a Link Control Protocol (LCP) step is only an option related to an authentication method.

Third, there is a problem in that a normal connection time longer than 1 second is required in order to perform a procedure of exchanging a lot of messages for the negotiation of options that are not required for the CDMA 2000 network, as described above.

DISCLOSURE OF THE INVENTION

Accordingly, the present invention has been made keeping in mind the above problems occurring in the prior art, and an object of the present invention is to provide a data call connection method for reducing connection time in a CDMA 2000 network, which exchanges only a minimal number of messages between an MS and a PDSN at the time of connecting a data call in the CDMA 2000 network. This improves on a conventional PPP connection method in the CDMA 2000 network, so that the authentication of the MS and the assignment of an IP address can be performed, thus realizing fast data call connection.

Another object of the present invention is to provide a data call connection method, which checks information about the version of an MS at the time of connecting a data call in a CDMA 2000 network, and performs a negotiation procedure suitable for the version of the MS, thus providing compatibility with an existing MS.

BEST MODE FOR CARRYING OUT THE INVENTION

In accordance with an aspect of the present invention to accomplish the above objects, there is provided a fast data call connection method between a Mobile Station (MS) and a Packet Data Service Node (PDSN) in a Code Division Multiple Access (CDMA) 2000 network, comprising a first step of the PDSN transmitting a data call connection request message, including an authentication type and a challenge value, to the MS; a second step of the MS, having received the data call connection request message, transmitting a data call connection response message, including a response to the challenge value, to the PDSN; and a third step of the PDSN performing authentication with reference to the data call connection response message, and transmitting a data call connection complete message to the MS if authentication succeeds.

In accordance with another aspect of the present invention, there is provided a fast data call connection method between a Mobile Station (MS) and a Packet Data Service Node (PDSN) in a Code Division Multiple Access (CDMA) 2000 network, comprising a first step of the PDSN transmitting a data call connection request message, including a Clear Text authentication type, to the MS; a second step of the MS, having received the data call connection request message, transmitting a data call connection response message, including an authentication request value, to the PDSN; and a third step of the PDSN performing authentication with reference to the data call connection response message, and transmitting a data call connection complete message to the MS if authentication succeeds.

In accordance with a further aspect of the present invention, there is provided a fast data call connection method between a Mobile Station (MS) and a Packet Data Service Node (PDSN) in a Code Division Multiple Access (CDMA) 2000 network, comprising a first step of the PDSN transmitting a data call connection request message, including an authentication type, to the MS; a second step of the MS, having received the data call connection request message, transmitting a data call connection response message, including a no-authentication request, to the PDSN; and a third step of the PDSN transmitting a data call connection complete message to the MS.

Hereinafter, embodiments of the present invention will be described in detail with reference to the attached drawings.

Figure 2:
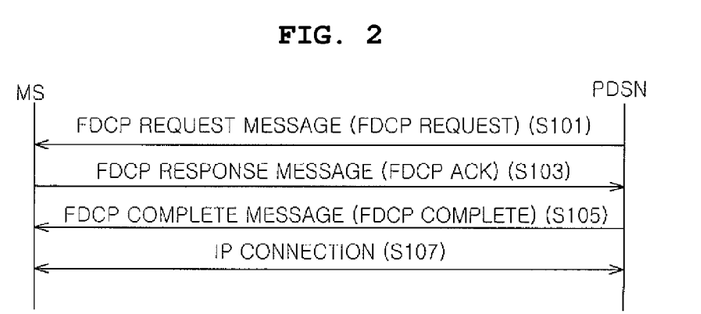
FIG. 2 is a flow diagram of a fast data call connection process according to an embodiment of the present invention.

FIG. 2 is a flow diagram of a data call connection process according to an embodiment of the present invention, which shows a data call connection process executed in response to a request from a Packet Data Service Node (PDSN).

A data call connection process according to the present invention is an operating procedure for a new protocol that has been proposed to improve on the conventional PPP connection process. For the convenience of description, the protocol proposed in the present invention is designated as a Fast Data-Link Connection Protocol (FDCP), and is described below.

As shown in the drawing, the data call connection process of the present invention performs data connection through the transmission/reception of three messages between a Mobile Station (MS) and a PDSN, the detailed procedure therefor being described below.

First, the PDSN transmits an FDCP request message (FDCP Request) to the MS as an initial message at step S101.

Table 1 shows an example of items included in the FDCP request message. In Table 1, TLV denotes which part of Type/Length(Octet)/Value is included in each item, and Presence denotes whether each item is mandatory (M), optional (O), or conditional (C).

TABLE 1

| Type ID | Field/option | Description | TLV | Presence | Length |
|---------|--------------|-------------|-----|----------|--------|
|  | FDCP Header | FDCP header | — | M | 13 |
| 0011H | Authentication parameter | Authentication parameter | TLV | O | ≥4 |
| 0015H | External authentication protocol | External authentication protocol | TLV | O | ≥4 |

As shown in Table 1, the FDCP request message may include an authentication parameter, and is composed of an authentication parameter ID field (T), a data length field (L), and an actual data field (V). The format of the authentication parameter is shown in the following Table 2.

| |
|---|
| authentication parameter ID |
| authentication parameter length |
| Authentication type |
| Authentication data length |
| Authentication data value |

In Table 2, the authentication parameter ID can be '0011H', as shown in Table 1, and the length of the authentication parameter is the total length of the authentication parameter. Further, authentication type may be one of Message Digest 5 (MD5), One Time Password (OTP) and Clear-Text (unencrypted authentication). If the authentication type (T) is MD5, an authentication data value (V) can be an MD5-challenge value, whereas if the authentication type (T) is OTP, the authentication data value (V) can be an OTP-challenge value.

Table 3 shows the description of each authentication type and the type of authentication data value included in authentication parameters.

TABLE 3

| Authentication type | Description | Authentication data value |
|---------------------|-------------|---------------------------|
| 00H | MD5(Default) | MD5-challenge value |
| 01H | OTP | OTP-challenge value (algorithm identifier, seed, serial number) |
| 02H | Clear Text | None |

In an embodiment of the present invention, when transmitting an FDCP request message to the MS, the PDSN can transmit an FDCP request message, with an authentication type and an authentication data value (that is, a challenge value) being included in the FDCP request message (that is, MD5 or OTP authentication is requested), or with only an authentication type being included in the FDCP request message (that is, unencrypted authentication is requested). As described later, the MS transmits different FDCP response messages depending on whether both an authentication type and a challenge value are included in an FDCP request message and whether only an authentication type is included in an FDCP request message, and depending on the authentication type that can be supported by the MS.

Meanwhile, the FDCP request message can also include an external authentication protocol. The external authentication protocol can be one of Extensible Authentication Protocol (EAP), PPP Authentication Protocol (PAP), and Challenge-Handshake Authentication Protocol (CHAP). The external authentication protocol is composed of an authentication protocol ID field (T), a data length field (L) and an actual data field (V).

With the development of wireless data services, the function of authenticating a subscriber's authority in the CDMA 2000 network has gradually increased in importance, and thus some authentication procedure is required. When an external authentication mode is used, it is preferable to use CHAP because PAP carries a possibility of a password being leaked, and is low in security.

The MS, having received the FDCP request message, transmits an FDCP response message (FDCP Ack) at step S103. The FDCP response message can include items shown in Table 4.

TABLE 4

| Type ID | Field/Option | Description | TLV | Presence | Length |
|---------|--------------|-------------|-----|----------|--------|
| | FDCP Header | FDCP header | — | M | 13 |
| 0001H | MRU | Maximum reception unit | TV | O | 4 |
| 0002H | IPv4 Address | IPv4 address | TV | O | 6 |
| 0003H | IPv6 Address | IPv6 address | TV | O | 18 |
| 0004H | IPv4 Primary DNS Address | IPv4 primary DNS address | TV | O | 6 |
| 0005H | IPv4 Secondary DNS Address | IPv4 secondary DNS address | TV | O | 6 |
| 0006H | IPv6 Primary DNS Address | IPv6 primary DNS address | TV | O | 18 |
| 0007H | IPv6 Secondary DNS Address | IPv6 secondary DNS address | TV | O | 18 |
| 0012H | Clear Text Authentication Request | Unencrypted authentication request | TLV | C | ≥5 |
| 0013H | MD5-Challenge Response | MD5-Challenge authentication response | TLV | C | 20 |
| 0014H | OTP-Challenge Response | OTP-Challenge authentication response | TLV | C | ≥5 |
| 0023H | No Authentication | No authentication | T | C | 1 |

With reference to Table 4, examples of items that can be included in the FDCP response message are described as follows.

The MS can request any one of the authentication algorithms, such as MD5, OTP, and Clear-Text, or can request no-authentication. The MS can transmit an FDCP response message, including any one of MD5-challenge response option, OTP-challenge response option, Clear-Text authentication request option, and a no-authentication option, depending on the authentication type included in the FDCP request message. Each option for an authentication request is composed of an option ID field (T), a data length part (L), and an actual data field (V).

In an embodiment of the present invention, if an authentication type and an authentication data value (that is, a challenge value) are included in the FDCP request message transmitted at step S101, the MS transmits an FDCP response message, with a response (MD5-Challenge Response) to the challenge being included in the FDCP response message. That is, when the PDSN designates an authentication type as MD5, and transmits an FDCP request message with MD5-challenge included in the FDCP request message, the MS transmits an FDCP response message including a response to the MD5 challenge. When the PDSN designates an authentication type as OTP, and transmits an FDCP request message with OTP-challenge included in the FDCP request message, the MS transmits an FDCP response message including a response to the OTP challenge (OTP-Challenge Response).

In another embodiment of the present invention, when a Clear Text authentication type is included in an FDCP request message, the MS transmits an FDCP response message with an authentication request value included in the FDCP response message. That is, when the PDSN designates an authentication type as Clear Text, the PDSN includes an authentication request value, for example, a peer ID and a password, in an FDCP request message, and transmits the FDCP request message.

In a further embodiment of the present invention, the MS can transmit an FDCP response message requesting no-authentication, regardless of the authentication type included in the FDCP request message.

Meanwhile, the MS can support any one of the external authentication algorithms, such as EAP, PAP and CHAP. In this case, an external authentication request algorithm that can be supported is included in the no-authentication field of an FDCP response message, and the FDCP response message can be transmitted. When the MS supports an external authentication algorithm, the transmission/reception of additional FDCP messages is required between the MS and the PDSN, and a detailed description thereof will be provided later with reference to FIGS. 5 to 7.

Next, a Maximum Receive Unit (MRU) option is a field for defining the maximum length of an IP packet. If the MRU option is not included in an FDCP response message, the length of an IP packet is determined to be a default value (for example, 1500 bytes).

Further, an FDCP response message can include an Internet Protocol Version 4 (IPv4) address or an IPv6 address depending on whether the MS supports IPv4 or IPv6. When an IP address, IPv4 or IPv6 (or can also refer to 'IP address option'), is included in an FDCP response message, the FDCP response message may include a primary DNS address or a secondary DNS address. When an IP address is not included in an FDCP response message, it is considered that the MS supports a mobile IP address.

As an IP address, a simple IP address or a fixed IP address can be used. If the MS supports simple IPv4 or simple IPv6, the MS transmits an FDCP response message, with an IP address set to 0, at the time of transmitting an FDCP response message, thus requesting the assignment of an address. For example, in the case of IPv4, the address can be set to 0.0.0.0. In contrast, when the MS supports fixed IPv4 or fixed IPv6, the MS includes an IP address and a DNS address, which have been previously assigned and stored, in the IP address and DNS address fields of an FDCP response message, and transmits the FDCP response message. In this case, the term "simple IP connection" means the case where a temporary IP address is assigned upon each connection.

For example, when the MS attempts an IPv6 call, the MS transmits an IP address with an IPv6 address included in the IP address. For example, when a call is attempted using a mobile IP, the MS transmits an FDCP response message without including an IP address in the FDCP response message, thus transmitting to the PDSN the fact that a call is being attempted using a mobile IP.

Although not shown in the drawing, it is preferable that, after transmitting an FDCP request message to the MS at step S101, the PDSN operates a timer, and releases a session if an FDCP response message is not received from the MS within a preset period.

Further, as the result of the examination of an authentication parameter option, included in the FDCP request message, by the MS having received the FDCP request message from the PDSN, if no authentication mode that can be supported exists, the MS transmits an FDCP reject message (FDCP Reject), including the cause of rejection, rather than an FDCP response message, to the PDSN, and thus the PDSN releases the session.

After the FDCP response message has been transmitted to the PDSN from the MS at step S103, the PDSN authenticates the MS with reference to an authentication request option included in the FDCP response message, and transmits an FDCP complete message (FDCP Complete) at step S105 if authentication succeeds. If authentication fails after the PDSN receives the FDCP response message from the MS at step S103, it is preferable that the PDSN transmit an FDCP reject message (FDCP Reject) to the MS and release the session.

In detail, the PDSN, having received the FDCP response message, performs authentication with reference to an authentication request option included in the FDCP response message transmitted by the MS. When the PDSN transmits an MD5 authentication type and an MD5 challenge value at step S101, and the MS transmits a response to the MD5 challenge at step S103, the PDSN performs authentication using the response to the MD5 challenge. Similarly, when the PDSN transmits an OTP authentication type and an OTP challenge value at step S101, and the MS transmits a response to the OTP challenge at step S103, the PDSN performs authentication using the response to the OTP challenge. When the PDSN transmits a Clear Text authentication type at step S101 and the MS transmits an authentication request value required for Clear Text authentication (for example, a peer ID, a password, etc.) at step S103, the PDSN performs authentication using the authentication request value. However, when the MS requests no-authentication at step S103, the authentication procedure can be omitted.

Table 5 shows examples of the items included in an FDCP complete message.

For example, when the MS supports simple IPv4 or simple IPv6, the PDSN assigns an IP address and primary/secondary DNS addresses, includes the assigned addresses in the IP address field and primary/secondary DNS address fields of an FDCP complete message, and then transmits the FDCP complete message. When the MS supports fixed IPv4 or IPv6, the PDSN includes the IP address and primary/secondary DNS addresses, which have been included in the FDCP response message by the MS and transmitted by the MS, in the IP address field and primary/secondary DNS address fields of an FDCP complete message, without change, and then transmits the FDCP complete message.

If the MS supports simple IPv4 or simple IPv6, but the PDSN does not have an assignable IP address, the PDSN transmits an FDCP reject message (FDCP Reject), including the cause of rejection, to the MS, and releases the session. Further, when the MS supports fixed IPv4 or fixed IPv6, and transmits an FDCP response message, with an IP address and a DNS address being included in the FDCP response message, the PDSN determines whether the transmitted IP address is authentic. If the IP address is determined to be authentic, the PDSN performs a subsequent procedure, whereas, if the IP address is determined to be inauthentic, the PDSN transmits an FDCP reject message (FDCP Reject) to the MS, and releases a session.

Meanwhile, when an IP address is not included in the FDCP response message, the PDSN recognizes that a current call is a mobile IP call, transmits an FDCP complete message without including an IP address and a DNS address in the FDCP complete message, and performs a mobile IP call connection procedure. This procedure will be described later with reference to FIG. 3.

Referring to Table 5 again, the FDCP complete message may further include an IP compression protocol option. This is an option required when IP compression is supported, and is composed of an option IP field, an option length field, an IP compression protocol IP field, and an actual data field. The IP compression protocol can be one of Robust Header Compression (ROHC), regular IP data, compression Transmission Control Protocol/Internet Protocol (TCP/IP), and decompression TCP/IP.

TABLE 5

| Type ID | Field/option | Description | TLV | Presence | Length |
|---|---|---|---|---|---|
|  | FDCP Header | FDCP header | — | M | 13 |
| 0002H | MS IPv4 Address | IPv4 address | TV | O | 6 |
| 0003H | MS IPv6 Address | IPv6 address | TV | O | 18 |
| 0004H | IPv4 Primary DNS Address | IPv4 primary DNS address | TV | O | 6 |
| 0005H | IPv4 Secondary DNS Address | IPv4 secondary DNS address | TV | O | 6 |
| 0006H | IPv6 Primary DNS Address | IPv6 primary DNS address | TV | O | 18 |
| 0007H | IPv6 Secondary DNS Address | IPv6 secondary DNS address | TV | O | 18 |
| 0008H | PDSN IPv4 Address | IPv4 address | TV | O | 6 |
| 0009H | PDSN IPv6 Address | IPv6 address | TV | O | 18 |
| 0010H | IP Compression Protocol | IP compression protocol | TLV | O | ≥4 |

Figure 5:
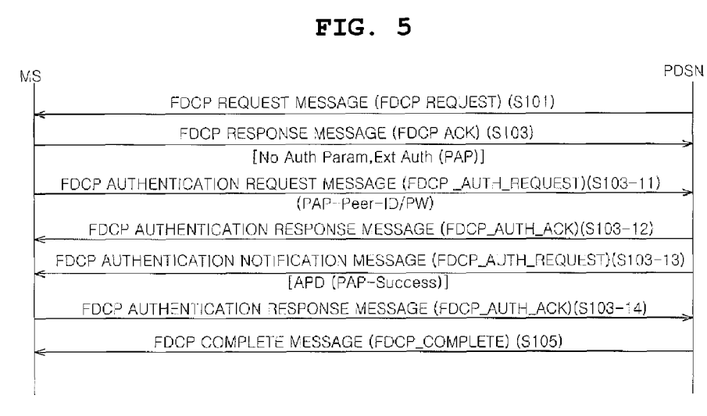
FIGS. 5 to 7 are flow diagrams showing an authentication procedure for data call connection according to the present invention.

Referring to FIG. 5, an FDCP complete message can include an IP address (or can also refer to 'IP address option') and a DNS address (or can also refer to 'DNS address option'). The FDCP complete message is assigned differently depending on whether the IP address is a simple IP address or fixed IP address, and has different formats corresponding to IPv4 or IPv6.

When a compression protocol option is included in an FDCP complete message, the MS and the PDSN transmit or receive compressed packet data depending on the compression protocol specified by the compression protocol option in a subsequent IP communication procedure.

When the IP connection procedure is completed through the above procedure, IP communication starts at step S107.

Although not shown in the drawing, the MS and the PDSN may add one or two FDCP messages when another option, not described above, is added. For example, in order to determine whether an Always-On option is activated, the PDSN transmits an FDCP keep-alive message (FDCP_KEEP_ALIVE) to the MS after transmitting the FDCP complete message. If a response message to the FDCP keep-alive message (FDCP_KEEP_ALIVE ACK) is received from the MS, the PDSN maintains an FDCP session in an activated state.

Figure 3:
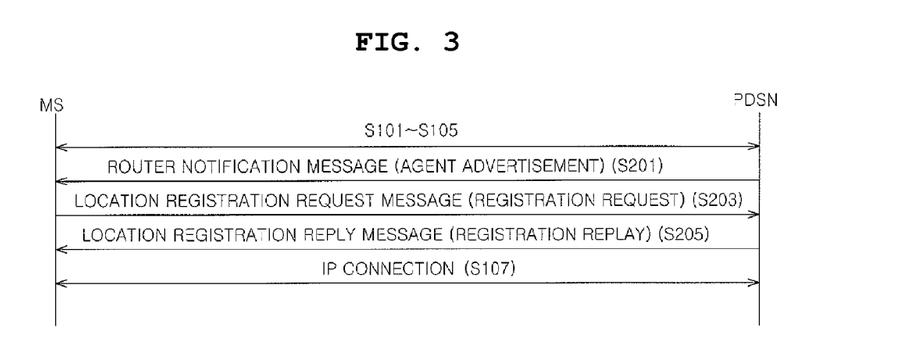
FIG. 3 is a flow diagram showing a mobile IP procedure in the data call connection process according to the present invention.

FIG. 3 is a flow diagram showing a mobile IP procedure in the data call connection process according to the present invention.

When the MS supports a mobile IP, options related to an IP address and a DNS address are not included in an FDCP response message or an FDCP complete message, as described above. After FDCP session negotiation has been performed, a separate procedure for mobile IP service is independently performed.

FIG. 3 illustrates a mobile IP procedure after the FDCP session negotiation has been performed at steps S101 to S105. After transmitting the FDCP complete message, the PDSN transmits a router notification message (Agent Advertisement) to the MS at step S201. Thereafter, if the MS requests location registration (Registration Request) at step S203, the PDSN performs location registration on the MS and transmits a location registration reply message (Registration Reply) to the MS at step S205, so that the mobile IP procedure is completed, and a mobile IP call is initiated at step S107.

At step S205, since the PDSN includes an IP address, existing in the home address region of a corresponding MS, in a location registration reply message, and transmits the location registration reply message, a separate IP address is not used during a previous session negotiation procedure.

As described above, the present invention omits an unnecessary step from a conventional PPP negotiation procedure, or simultaneously performs corresponding steps when a data call is connected in a CDMA 2000 network, thus reducing connection time.

Such a negotiation procedure may be supported or not supported depending on the version of the MS. For this operation, the present invention checks version information of the MS before the negotiation procedure is performed, thus performing a control operation so that either a negotiation procedure according to the present invention or a conventional PPP negotiation procedure is performed.

Figure 4A:
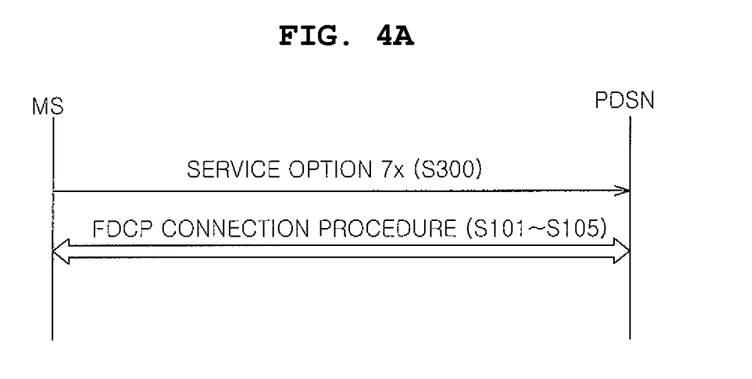
FIGS. 4A and 4B are flow diagrams showing a procedure for checking the version of an MS to provide backward compatibility in the data call connection method according to the present invention.
Figure 4B:
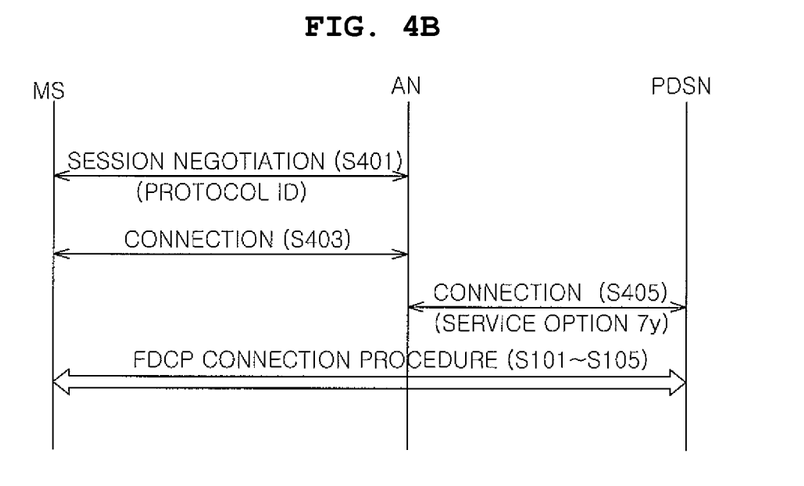

FIGS. 4A and 4B are flow diagrams showing a procedure for checking the version of an MS to provide backward compatibility in the data call connection method according to the present invention.

In the present invention, the MS transmits MS version information to the PDSN through a base station controller (or an access network) when connecting a call for packet data service. The PDSN, having received the MS version information, checks the MS version information. If the MS is determined to be an MS that supports FDCP, the PDSN performs the negotiation procedure of FIG. 2, otherwise, the PDSN performs a conventional PPP negotiation procedure.

First, FIG. 4A is a flow diagram showing a procedure for checking the version of an MS to provide compatibility with an existing MS in a CDMA2000 1X network. The MS can transmit service option 7x, which is a new service option assigned to indicate that the MS is an FDCP-supporting MS, when performing a service option negotiation procedure with the PDSN at step S300. The PDSN, having received the service option 7x, recognizes that the corresponding MS is an MS to which FDCP can be applied, and performs the FDCP connection procedure including steps S101 to S105 of FIG. 2.

Although not shown in the drawing, an MS that does not support an FDCP connection procedure transmits service option 33 to the PDSN. In this case, the PDSN performs a conventional PPP negotiation procedure.

Meanwhile, FIG. 4B is a flow diagram showing a procedure for checking the version of an MS to provide compatibility with an existing MS in a CDMA2000 HRPD network. The MS transmits a protocol ID when performing session negotiation with an Access Network (AN) at step S401. After the session negotiation between the MS and the access network (AN) has been completed at step S403, the AN transmits service 7y, which is a new service option assigned to indicate that the MS is an FDCP-supporting MS, with reference to the protocol ID received from the MS at step S405 when the AN and the PDSN perform a service option negotiation procedure.

Accordingly, the PDSN recognizes that the MS is an MS to which FDCP can be applied, and performs the FDCP connection procedure including steps S101 to S105 of FIG. 2.

In this case, when performing the session negotiation with the AN, the MS can include an ID, indicating FDCP as a protocol ID, for example in an enhanced multi-flow packet application parameter, as a protocol ID during session negotiation with the AN, and then transmit the enhanced multi-flow packet application parameter.

Although not shown in the drawing, in the case of an MS that does not support the FDCP connection procedure in the CDMA2000 HRPD network, the AN transmits service option 59 to the PDSN after the session negotiation between the MS and the AN has been performed. In this case, the PDSN performs a conventional PPP negotiation procedure.

In the above-described fast data call connection method, although the case where data call connection is performed in response to the request from the PDSN has been described, the case where data call connection is performed in response to a request from the MS can also be considered. In this case, after the MS has transmitted an FDCP session establishment request message (Request-FDCP-Creation) to the PDSN, the procedure including steps S101 to S105 of FIG. 2 is performed.

Figure 6:
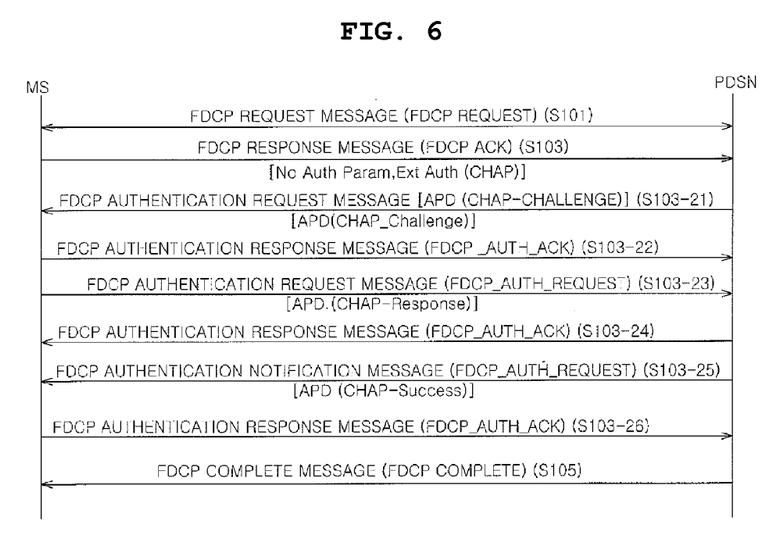
Figure 7:
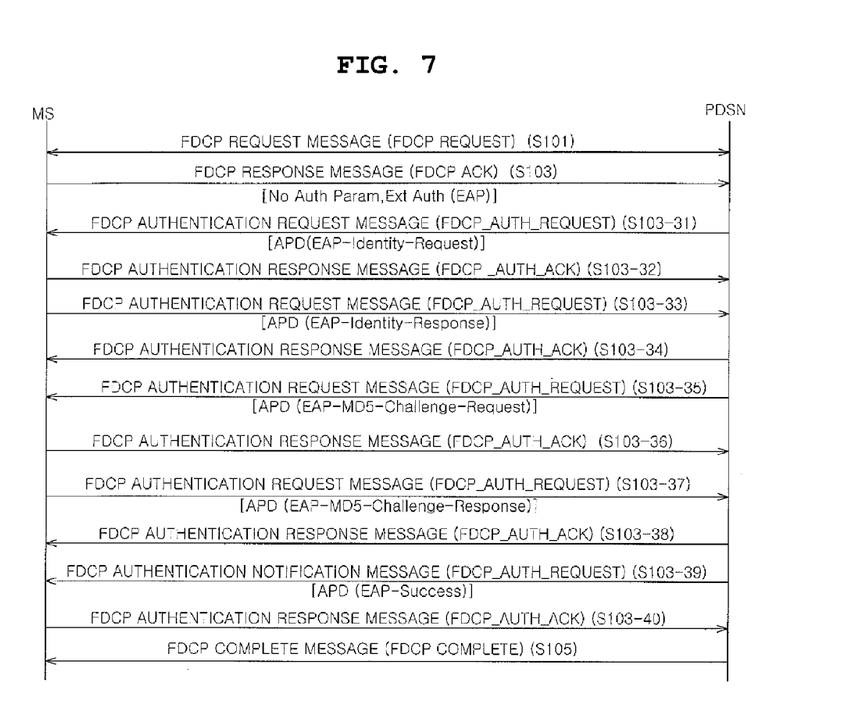

FIGS. 5 To 7 are flow diagrams of an authentication procedure for data call connection according to the present invention, which shows an authentication procedure when an MS supports external authentication algorithms.

FIG. 5 is a flow diagram showing an authentication procedure when the MS supports PAP, an external authentication algorithm.

When transmitting an FDCP response message in the case where the MS supports PAP, an external authentication algorithm, at step S103, the MS indicates the fact that PAP is a supported authentication algorithm in the no-authentication option field of the FDCP response message, and then transmits the FDCP response message (FDCP Ack [No Auth Param, Ext Auth(PAP)]). Then, the MS transmits an FDCP authentication request message (FDCP_Auth_Request), including a peer ID and a password (Peer-ID/PW) to the PDSN at step S103-11.

Accordingly, the PDSN transmits an FDCP authentication response message (FDCP_Auth_Ack) to the MS at step S103-12, and performs authentication. If authentication succeeds, the PDSN transmits an authentication notification message (FDCP_Auth_Request [APD(PAP-Success)]), indicating that authentication has succeeded, at step S103-13, and the MS transmits an FDCP authentication response message (FDCP_Auth_Ack) to the PDSN at step S103-14, thus completing the PAP authentication procedure. The PDSN transmits an FDCP complete message to the MS at step S105, thereby providing data service.

FIG. 6 is a flow diagram showing an authentication procedure when the MS supports CHAP, an external authentication algorithm.

When transmitting an FDCP response message in the case where the MS supports CHAP, an external authentication algorithm, at step S103, the MS indicates the fact that CHAP is a supported authentication algorithm in the no-authentication option field of the FDCP response message, and then transmits the FDCP response message (FDCP Ack [No Auth Param, Ext Auth(CHAP)]).

Accordingly, the PDSN transmits an FDCP authentication request message including an encoded CHAP challenge (FDCP_Auth_Request[APD(CHAP-Challenge)]) to the MS at step S103-21. After transmitting a response message (FDCP_Auth_Ack) to the FDCP authentication request message at step S103-22, the MS transmits an FDCP authentication request message including an encoded CHAP response (FDCP_Auth_Request[APD(CHAP-Response)]) at step S103-23.

Next, the PDSN transmits an FDCP authentication response message (FDCP_Auth_Ack) to the MS at step S103-24, and then performs authentication using the CHAP response received from the MS. If authentication succeeds, the PDSN transmits an FDCP authentication notification message (FDCP_Auth_Request[APD(CHAP-Success)]), indicating the success of authentication, at step S103-25. If a response message (FDCP_Auth_Ack) to the FDCP authentication notification message is received from the MS at step S103-26, the CHAP authentication procedure is completed, and the PDSN transmits an FDCP complete message to the MS at step S105, thus providing data service.

FIG. 7 is a flow diagram showing an authentication procedure when the MS supports EAP, an external authentication algorithm.

When transmitting an FDCP response message in the case where the MS supports EAP, an external authentication algorithm, at step S103, the MS indicates the fact that EAP is a supported authentication algorithm in the no-authentication option field of the FDCP response message, and then transmits the FDCP response message (FDCP Ack [No Auth Param, Ext Auth(EAP)]).

Accordingly, the PDSN transmits an FDCP authentication request message (FDCP_Auth_Request[APD(EAP-Identity-Request)]), requesting an identity for EAP authentication, to the MS at step S103-31. The MS transmits both a response message (FDCP_Auth_Ack) to the FDCP authentication request message and an FDCP authentication request message including an EAP identity (FDCP_Auth_Request[APD(EAP-Identity-Response)]) to the PDSN at steps S103-32 and S103-33.

Thereafter, the PDSN transmits a response message (FDCP_Auth_Ack), responding to the reception of the EAP identity, to the MS, and then transmits an FDCP authentication request message (FDCP_Auth_Request[APD(EAP-MD5-Challenge-Request)]), requesting an EAP-MD5-challenge, to the MS at steps S103-34 and S103-35.

The MS transmits a response message (FDCP_Auth_Ack) to the PDSN, and thereafter transmits an FDCP authentication request message including an EAP-MD5-challenge response (FDCP_Auth_Request[APD(EAP-MD5-Challenge-Response)]) at steps S103-36 and S103-37. The PDSN transmits a response message (FDCP_Auth_Ack) to the FDCP authentication request message at step S103-38, and then performs authentication.

If authentication succeeds, the PDSN transmits an FDCP authentication notification message (FDCP_Auth_Request [APD(EAP-Success)]) to the MS at step S103-39. If a response message (FDCP_Auth_Ack) to the FDCP authentication notification message is received from the MS at step S103-40, the PDSN transmits an FDCP complete message to the MS at step S105, thus providing data service.

Hereinbefore, the fast data call connection method between the MS and the PDSN using the FDCP protocol has been described. Such a function can be installed on a recording medium in the form of programs that can be executed in the MS and the PDSN.

A recording medium according to an embodiment of the present invention can be implemented as a recording medium in which a program to be executed in, for example, PDSN, is recorded. The program can be implemented as a program required to sequentially execute a first function of generating a data call connection request message, including an authentication type and a challenge value, and transmitting the data call connection request message to the MS, and a second function of performing authentication with reference to a data call connection response message, including a response to the challenge value, when the MS transmits the data call connection response message, and of generating a data call connection complete message and transmitting the data call connection complete message to the MS if authentication succeeds. The implementation of the recording medium is not limited to the PDSN, but the recording medium can be implemented in any device capable of performing a fast data call connection procedure together with the MS.

Furthermore, a recording medium according to another embodiment of the present invention can be implemented as a recording medium in which a program to be executed in an MS is recorded. The program can be implemented as a program required to execute a first function of generating and transmitting a data call connection response message, including a response to a challenge value, when the MS receives a data call connection request message, including an authentication type and the challenge value, and a second function of receiving a data call connection complete message and determining that data call connection has been completed.

As described above, those skilled in the art will appreciate that various modifications, additions and substitutions are possible, without departing from the scope and spirit of the invention as disclosed in the accompanying claims. Therefore, it should be understood that the above-described embodiments are not limiting, but are only exemplary. The scope of the present invention is defined by the accompanying claims rather than the detailed description. All changes or modifications that can be derived from the meaning and scope of the claims and equivalent concepts thereof should be interpreted as being included in the scope of the present invention.

Industrial Applicability

According to the present invention, the existing 13 or more messages required in a call connection process in a CDMA2000 network can be reduced to 3 messages, so that the connection time can be greatly reduced, and messages, which are not actually required in three stages (LCP, CHAP and IPCP) used in conventional PPP connection, are omitted, or corresponding steps are simultaneously performed, thus reducing connection time and increasing the probability of connection success.

Further, the present invention is advantageous in that it checks the version information of a mobile station before an authentication procedure and an IP assignment procedure are performed, so that authentication and IP assignment can be performed using a method that is possible among a conventional PPP connection method and an FDCP connection method according to the present invention, thus guaranteeing compatibility even with a mobile station that does not support the FDCP connection method.

The invention claimed is:

1. A fast data call connection method between a Mobile Station and a Node serving packet data in a wireless network, comprising:
   transmitting a first message containing an authentication type and a challenge value thereof to the Mobile Station by the Node;
   transmitting a second message containing an authentication response to the authentication type and the challenge value to the Node by the Mobile Station;
   transmitting a third message to the Mobile Station by the Node, when authentication of the Mobile Station is successfully performed by using the authentication response, wherein at least one of the second message and the third message contain at least one IP (Internet Protocol) address information assigned for the Mobile Station; and
   exchanging packet data between the Mobile Station and the Node over a data link in point-to-point protocol (PPP), wherein the data link in the PPP is connected between the Mobile Station and the Node by exchanging the first message, second message and third message, and
   wherein the fast data call connection method, before the transmission of the first message, further comprises
   negotiating a session with protocol ID, which indicates a fast data call connection, between the Mobile Station and an Access Network(AN);
   sending a service option for the fast data call connection, to the Node by the AN; and
   receiving the service option and recognizing the Mobile Station supports fast data call connection, by the Node.

2. The fast data call connection method according to claim 1, wherein the authentication type in the first message is CHAP (Challenged Handshake Authentication Protocol).

3. The fast data call connection method according to claim 1, wherein the third message contains an IP compression information.

4. The fast data call connection method according to claim 1, wherein the second message contains an IP address of the Mobile Station, and the third message contains the IP address of the Node.

5. The fast data call connection method according to claim 1, wherein the second message does not contain an IP address, and the third message contains the IP address of the Node.

6. The fast data call connection method according to claim 5, between the transmission of the third message and the exchange of packet data, further comprising:
   transmitting a router notification message to the Mobile Station by the Node;
   receiving the router notification message and requesting location registration to the Node by the Mobile Station; and
   performing the location registration of the Mobile Station and transmitting a location registration reply message to the Mobile Station, by the Node.

7. The fast data call connection method according to claim 1, wherein the second message contains an IP address which is set to "0", and the third message contains the IP address assigned for the Mobile Station, and the IP address of the Node.

8. A non-transitory computer-readable recording medium for storing a program executed in a Node serving packet data in a wireless network to implement fast data call connection between a Mobile Station and the Node, the program sequentially executing:
   a first function of generating a first message containing an authentication type and a challenge value thereof, and transmitting the first message to the Mobile Station;
   a second function of receiving a second message containing an authentication response to the authentication type and the challenge value from the Mobile Station, and transmitting a third message when authentication of the Mobile Station is successfully performed, wherein at least one of the second message and the third message contain at least one IP (Internet Protocol) address information assigned for the Mobile Station; and
   a third function of exchanging packet data with the Mobile Station over a data link in point-to-point protocol (PPP), wherein the data link in the PPP is connected between the Mobile Station and the Node by exchanging the first message, second message and third message, and
   wherein the program, before executing the first function, further executes functions of
   receiving a service option from an Access Network (AN) which negotiates a session with protocol ID, which indicates a fast data call connection, with the Mobile Station, and
   recognizing the Mobile Station supports fast data call connection.

9. The non-transitory computer-readable recording medium according to claim 8, wherein the authentication type in the first message is CHAP (Challenged Handshake Authentication Protocol).

10. The non-transitory computer-readable recording medium according to claim 8, wherein the third message contains an IP compression information.

11. The non-transitory computer-readable recording medium according to claim 8, wherein the second message contains an IP address of the Mobile Station, and the third message contains the IP address of the Node.

12. The non-transitory computer-readable recording medium according to claim 8, the program, between the second function and the third function, further executing:
    a function of transmitting a router notification message to the Mobile Station;
    a function of receiving a request for location registration from the Mobile Station; and
    a function of performing location registration of the Mobile Station and transmitting a location registration reply message to the Mobile Station.

13. The non-transitory computer-readable recording medium according to claim 8, wherein the second message contains an IP address which is set to "0", and the third message contains the IP address assigned for the Mobile Station, and the IP address of the Node.

14. A non-transitory computer-readable recording medium for storing a program executed in a Mobile Station to implement fast data call connection between the Mobile Station and a Node serving packet data in a wireless network, the program sequentially executing:
    a first function of receiving a first message containing an authentication type and a challenge value thereof from the Node;
    a second function of generating a second message containing an authentication response to the authentication type and the challenge value, and transmitting the second message to the Node;

a third function of receiving a third message from the Node, when authentication of the Mobile Station is successfully performed; and a fourth function of exchanging packet data with the Node, wherein at least one of the second message and the third message contain at least one IP(Internet Protocol) address information assigned for the Mobile Station over a data link in point-to-point protocol (PPP), wherein the data link in the PPP is connected between the Mobile Station and the Node by exchanging the first message, second message and third message, and wherein the program, before executing the first function, further executes:

negotiating a session with protocol ID, which indicates a fast data call connection, with an Access Network(AN) so that the AN sends a service option for the fast data call connection to the Node.

15. The non-transitory computer-readable recording medium according to claim 14, wherein the second message contains an IP address which is set to "0", and the third message contains the IP address assigned for the Mobile Station, and the IP address of the Node.

16. The non-transitory computer-readable recording medium according to claim 14, wherein the second message contains an IP address of the Mobile Station, and the third message contains the IP address of the Node.

17. A fast data call connection method of a Mobile Station to implement fast data call connection with a Node serving packet data in a wireless network, comprising:

receiving a first message containing an authentication type and a challenge value thereof from the Node;

transmitting a second message containing an authentication response to the authentication type and the challenge value to the Node;

receiving a third message from the Node, when authentication of the Mobile Station is successfully performed; and exchanging packet data with the Node, wherein at least one of the second message and the third message contain at least one IP(Internet Protocol) address information assigned for the Mobile Station over a data link in point-to-point protocol (PPP), wherein the data link in the PPP is connected between the Mobile Station and the Node by exchanging the first message, second message and third message, and wherein the fast data call connection method, before the transmission of the first message, further comprises negotiating a session with protocol ID, which indicates a fast data call connection, with an Access Network(AN) so that the AN sends a service option for the fast data call connection to the Node.

18. The fast data call connection method of the Mobile Station according to claim 17, wherein the second message contains an IP address which is set to "0", and the third message contains the IP address assigned for the Mobile Station, and the IP address of the Node.

19. The fast data call connection method of the Mobile Station according to claim 17, wherein the second message contains an IP address of the Mobile Station, and the third message contains the IP address of the Node.

20. The fast data call connection method of the Mobile Station according to claim 17, wherein the second message doesn't contain an IP address, and the third message contains the IP address of the Node.

21. A fast data call connection method between a Mobile Station and a Node serving packet data in a wireless network, consisting of:

transmitting a first message containing an authentication type and a challenge value thereof to the Mobile Station by the Node;

transmitting a second message containing an authentication response to the authentication type and the challenge value to the Node by the Mobile Station;

transmitting a third message to the Mobile Station by the Node, when authentication of the Mobile Station is successfully performed by using the authentication response, wherein at least one of the second message and the third message contain at least one IP (Internet Protocol) address information assigned for the Mobile Station; and exchanging packet data between the Mobile Station and the Node, wherein the first and second messages are used for the authentication of the Mobile Station and the second and third messages are used for an assignment of an IP address, and wherein the fast data call connection method, before the transmission of the first message, further comprises:

negotiating a session with protocol ID, which indicates a fast data call connection, between the Mobile Station and an Access Network(AN);

sending a service option for the fast data call connection, to the Node by the AN; and receiving the service option and recognizing the Mobile Station supports fast data call connection, by the Node.

* * * * *